(12) United States Patent
Fakhruddin

(10) Patent No.: US 6,839,089 B2
(45) Date of Patent: Jan. 4, 2005

(54) SIGNAL PROCESSING DEVICE AND SIGNAL PROCESSING METHOD

(75) Inventor: Muzaffar Husain Bin Fakhruddin, Tokyo (JP)

(73) Assignee: Sony Corporation, Tokyo (JP)

( * ) Notice: Subject to any disclaimer, the term of this patent is extended or adjusted under 35 U.S.C. 154(b) by 578 days.

(21) Appl. No.: 09/894,307

(22) Filed: Jun. 27, 2001

(65) Prior Publication Data

US 2002/0057368 A1 May 16, 2002

(30) Foreign Application Priority Data

Jun. 29, 2000 (JP) .................................. 2000-197404

(51) Int. Cl.⁷ .................................................. H04N 7/01
(52) U.S. Cl. .................................. 348/459; 348/443
(58) Field of Search ................................. 348/452, 451, 348/459, 443, 699, 700, 701, 702, 97, 98; H04N 7/01

(56) References Cited

U.S. PATENT DOCUMENTS 4,296,434 A * 10/1981 Drewery et al. ............ 348/579
4,881,125 A * 11/1989 Krause ........................ 348/448
4,982,280 A    1/1991 Lyon et al.
5,742,351 A *  4/1998 Guede ........................ 348/459
6,072,542 A    6/2000 Wilcox et al.

* cited by examiner

*Primary Examiner*—Michael H. Lee
(74) *Attorney, Agent, or Firm*—Frommer Lawrence & Haug LLP; William S. Frommer (57) ABSTRACT

There is provided a signal processing device in which its structure is simplified and a source subjected to a pull-down processing is detected at high precision. The signal processing device includes a comparison portion and a detection portion in which fields constituting a signal source are successively inputted, two fields are compared with each other, and it is judged whether or not there is a motion between the two fields, and a logic block for shifting a state on the basis of a judgement result as to whether or not there is a motion in the detection portion and for controlling judgement characteristics of the detection portion on the basis of the shifted state.

9 Claims, 8 Drawing Sheets

| PATTERN | LOAD VALUE (RESET VALUE) |
|---------|--------------------------|
| 11011   | 0                        |
| 10111   | 1                        |
| 01111   | 2                        |
| 11110   | 3                        |
| 11101   | 4                        |
| OTHERS  | 0                        |

SIGNAL PROCESSING DEVICE AND SIGNAL PROCESSING METHOD

BACKGROUND OF THE INVENTION

1. Field of the Invention

The present invention relates to a signal processing device for identifying a signal and a signal processing method, and more particularly to a signal processing device for identifying an image source and a signal processing method.

2. Description of the Related Art

In the case where an image formed for a movie is broadcasted in television broadcasting, it is necessary to convert a picture recorded on a film (film source) of the movie into an NTSC signal. In general, while a film source of a movie or the like has 24 frames per second, an NTSC television system has 30 frames per second (60 fields per second), and the conversion is needed from this. As a conversion method, there is a frame number converting processing such as "3-2 pull-down (3:2 pull-down)" processing for converting a film source of 24 Hz into an NTSC signal of 60 Hz.

Figure 8A:
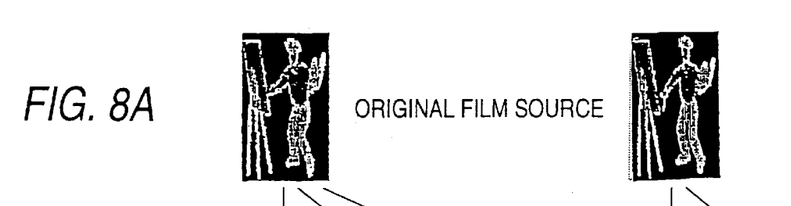
FIGS. 8A and 8B are views used for explaining a 3-2 pull-down processing.
Figure 8B:
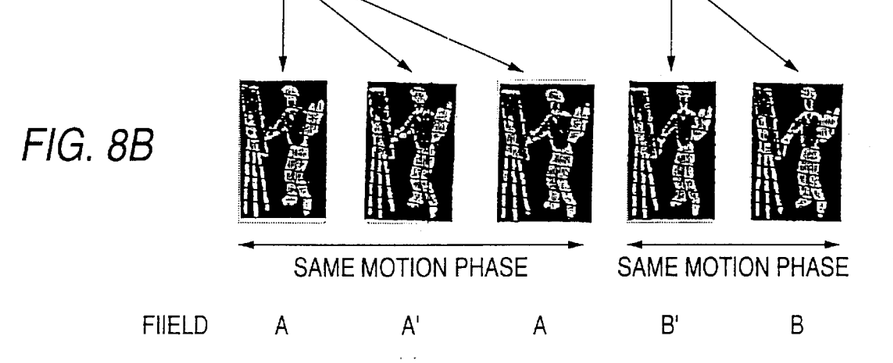

Specifically, the 3-2 pull-down processing is such processing that in continuous two frames of the film source, the first frame is read out as three fields of video signals, the next frame is read out as two fields, and such readout operation is repeated. For example, as shown in FIGS. 8A to 8B, three fields A, A', A are read out as video signals from a first frame of an original film source (Original Film Source 24 Hz-Progressive), and two fields B and B' are read out as video signals from a next frame of the original film source. In this way, in the 3-2 pull-down processing, continuous fields having the same image content are read out as 3, 2, 3, 2, 3 . . . fields as video signals. This is different from normal NTSC signals having different motion phases among all fields.

Incidentally, as a method of converting a picture recorded on a film source into an NTSC signal, there is also a method of repeating each frame three times, or a method of removing a field every other frame.

There are many devices for subjecting an NTSC signal to a signal processing. For example, a scanning line number doubling device is a signal processing device which can subject the NTSC signal to a scanning line doubling processing. On the other hand, as the NTSC signal, there are a normal NTSC signal and an NTSC signal subjected to the 3-2 pull-down processing as described above. From this, it is important to previously know (detect) whether the signal inputted to the signal processing device is the normal NTSC signal or the signal subjected to the 3-2 pull-down processing, in order to realize an optimum signal processing.

As methods for detecting an NTSC signal (hereinafter referred to as a 3-2 pull-down source) generated from a film source, there is such a method that motion detection is made when the source is inputted and it is classified as the 3-2 pull-down source. Such a method is a complicated one requiring an extremely large logic.

In most of these methods, various kinds of block matching methods are used in which not only an input of a source is detected, but also a motion vector is added to each object of a picture. Besides, although there are various applications, there is only one flag indicating that the input source is the 3-2 pull-down source and the phase of a current field is required.

Besides, in the foregoing methods, there are problems as follows:

In an application in which the motion vector is not used except at the detection of the 3-2 pull-down source and the detection of the phase of a current field in the sequence of the 3-2 pull-down source, a logic gate becomes very expensive in the foregoing block matching.

Besides, in order to detect the motion vector, that is, in order to detect the 3-2 pull-down sequence and the signal of the phase of the current field in the sequence, various kinds of post-processings become necessary.

Besides, the detection speed of a present system depends on the speed of convergence of the motion vector. This is contrary to the reliability of the motion vector.

SUMMARY OF THE INVENTION

Then, the present invention has been made in view of the above circumstances, and an object thereof is to provide a signal processing device in which its structure is made simple and a source subjected to a pull-down processing can be detected at high precision, and a signal processing method.

In order to solve the foregoing problem, a signal processing device of the present invention includes motion judgement means in which fields constituting a signal source are successively inputted, two fields are compared with each other, and it is judged whether or not there is a motion between the two fields, and state shift means for shifting a state on the basis of a judgement result of the motion judgement means and for controlling judgement characteristics of the motion judgement means on the basis of the shifted state.

In the signal processing device having the structure like this, the fields constituting the signal source are successively inputted, two fields are compared with each other, and it is judged by the motion judgement means whether or not there is a motion between the two fields, and further, the state is shifted on the basis of the judgement result of the motion judgement means, and the judgement characteristics of the motion judgement means are controlled by the state shift means on the basis of the shifted state.

By this, in the signal processing device, the motion judgement means having the judgement characteristics controlled to become optimum in accordance with the inputted field judges whether or not there is a motion between two fields.

Besides, in order to solve the foregoing problem, a signal processing method of the present invention includes a motion judgement step in which fields constituting a signal source are successively inputted, two fields are compared with each other, and it is judged by judgement means whether or not there is a motion between the two fields, and a state shift step of shifting a state on the basis of a judgement result at the motion judgement step and controlling judgement characteristics of the motion judgement means on the basis of the shifted state.

By this, in the signal processing method, the motion judgement means having the judgement characteristics controlled to become optimum in accordance with the inputted field judges whether or not there is a motion between two fields.

DETAILED DESCRIPTION OF THE PREFERRED EMBODIMENTS

Embodiments of the present invention will be described in detail with reference to the drawings. The principle of the present invention will be first described.

Figure 1A:
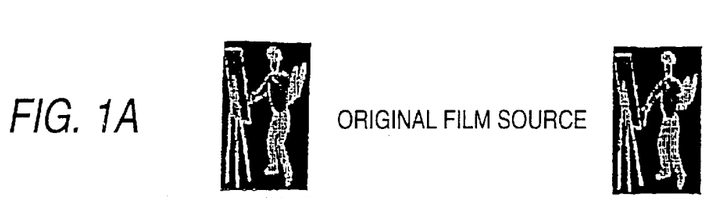
FIGS. 1A and 1B are views used for explaining the principle of detecting the kind of a field in a 3-2 pull-down source according to the present invention.
Figure 1B:
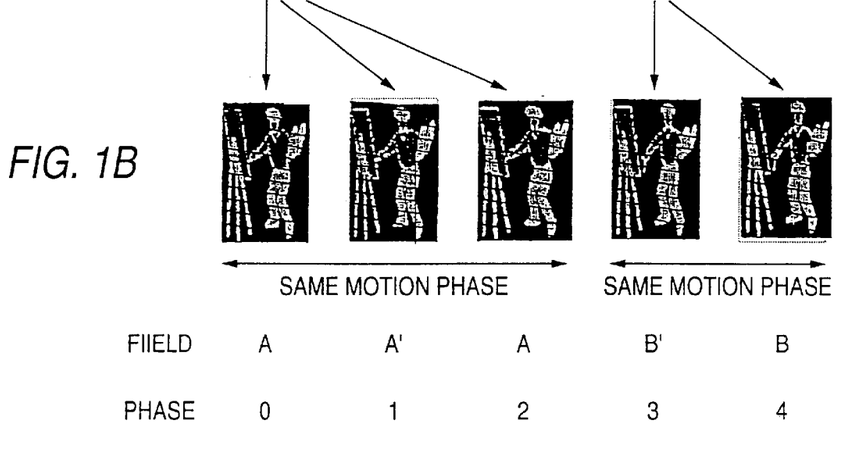

By the present invention, as shown in FIGS. 1A and 1B, phases of predetermined fields in a five-field period of an NTSC signal (hereinafter referred to as a 3-2 pull-down source) in which an input source is subjected to a 3-2 pull-down (also called a 2-3 pull-down) processing, are defined as "0", "1", "2", "3", and "4", and this can be obtained as field information. That is, as shown in FIGS. 1A and 1B, three fields A, A', and A read out as video signals from a first frame of a film source are respectively defined as phases "0", "1", and "2", and two fields B' and B read out as video signals from a next frame of the film source are respectively defined as phases "3" and "4". By this, a sequence is divided into a sequence made of five fields. The fields are detected as the phases defined like this from the inputted 3-2 pull-down source, and the phase information can be outputted as the field information.

Figure 2:
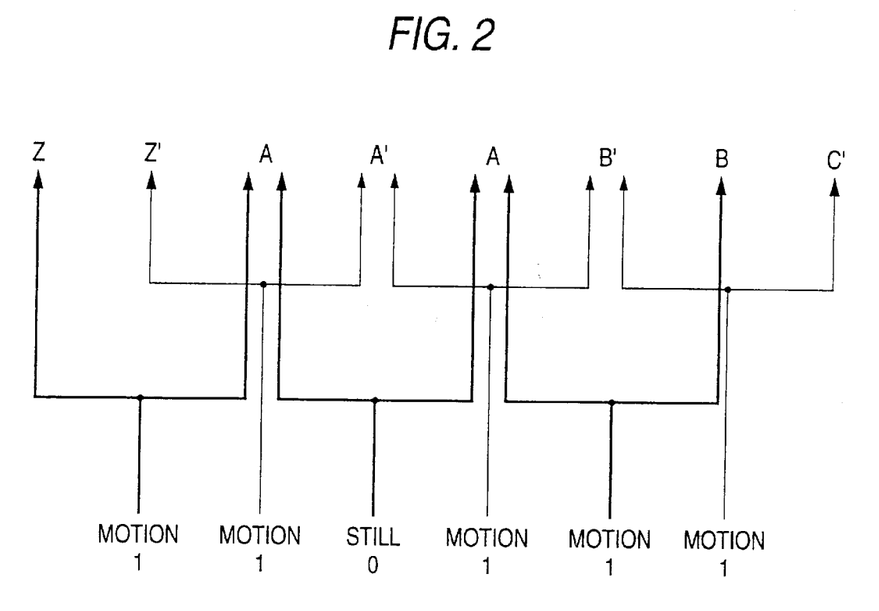
FIG. 2 is a view used for explaining the principle of detecting the kind of a 3-2 pull-down source according to the present invention.

Besides, according to the present invention, as shown in FIG. 2, it is possible to detect the 3-2 pull-down source by detecting that motion phases exist between two fields delayed by two fields. Here, the relation between fields delayed by two fields is the relation between adjacent odd fields or adjacent even fields.

As to the detection, specifically, "1" is marked in the case where there is a motion between fields having the relation of a delay of two fields, and "0" is marked in the case where there is no motion, that is, in the case of a standstill. The 3-2 pull-down source is identified on the basis of the detection result of "1" and "0". That is, as a pattern as shown in FIG. 2, in the case where a pattern of "1", "1", "0", "1", "1" is obtained, it is possible to recognize that the input source is the 3-2 pull-down source. Here, it is assumed that "1" and "0" determined in accordance with the existence of a motion and the nonexistence of a motion after two fields are compared with each other are made to correspond to a current field (input field) and are marked. Incidentally, it is needless to say that "1" and "0" are not restricted to the case where they are made to correspond to the current field.

Figure 3:
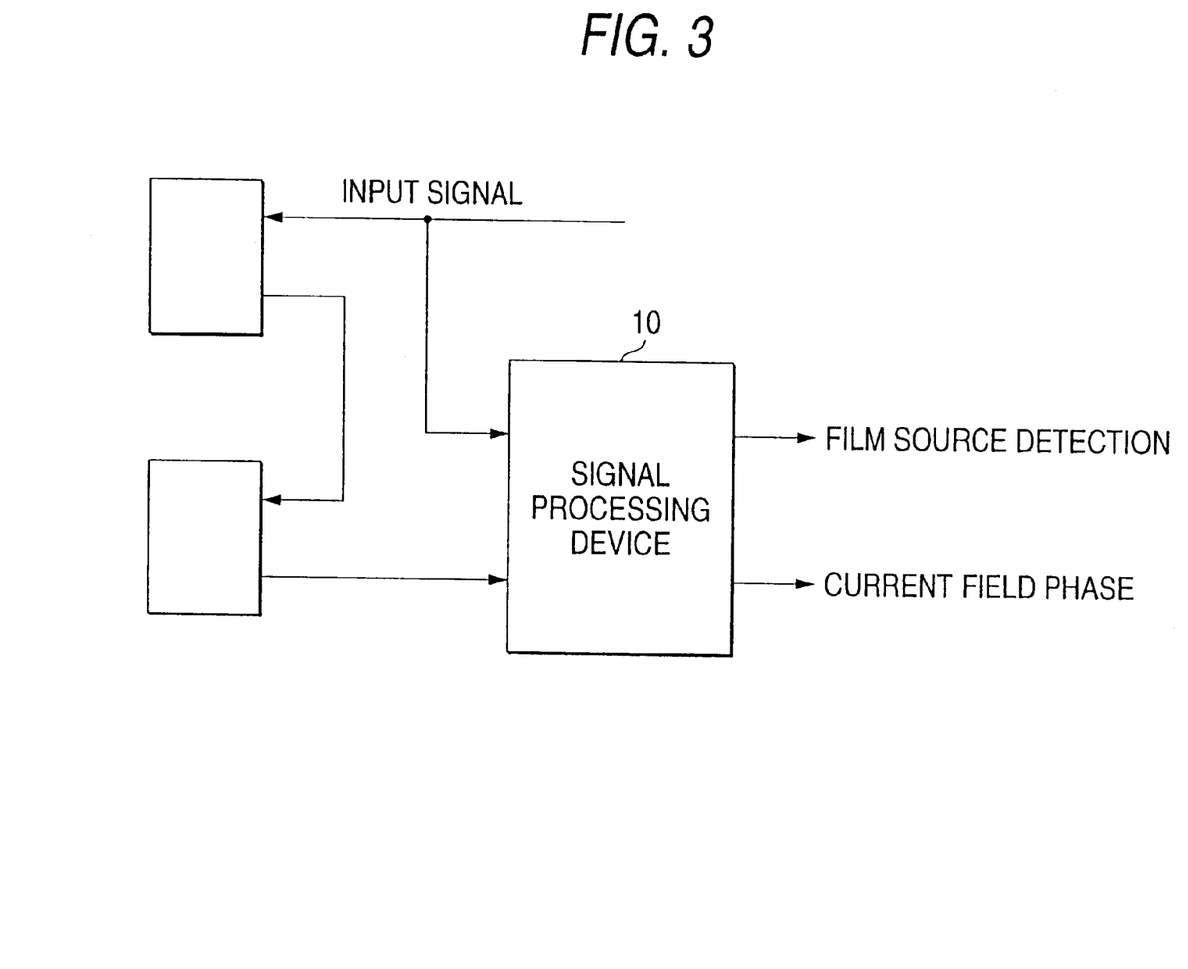
FIG. 3 is a block diagram showing a case in which a signal processing device to which the present invention is applied outputs film source detection information as a detection result and outputs a current field phase.

Hereinafter, as the embodiment of the present invention, a signal processing device to which the present invention is applied will be described. The signal processing device has a function to identify whether the input source is a 3-2 pull-down source or a normal NTSC signal (hereinafter referred to as an NTSC camera source) which is not subjected to the 3-2 pull-down processing. Besides, the signal detection device has a function to detect a phase as information of a current field with respect to a 3-2 pull-down sequence. As a result of such functions, as shown in FIG. 3, the signal processing device 10 externally outputs a film source detection signal as information of the existence or nonexistance of detection of a film source, or externally outputs current field phase information as information of the phase of the current field.

Figure 4:
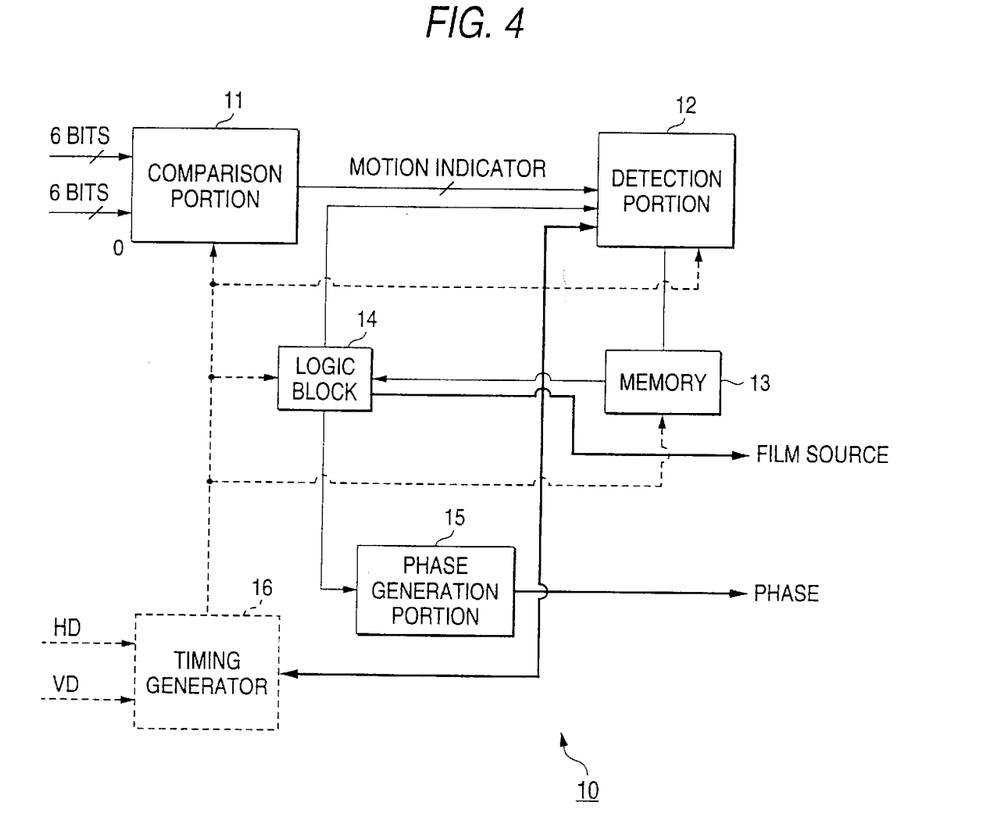
FIG. 4 is a block diagram showing a specific structure of the foregoing signal processing device.

The signal detection device 10 is specifically constructed as shown in FIG. 4. The signal detection device 10 includes a comparison portion 11, a detection portion 12, a memory 13, a logic block 14, a phase generation portion 15, and a timing generator 16.

In this signal processing device 10, the comparison portion 11 and the detection portion 12 constitute motion judgement means in which fields constituting a signal source are successively inputted, two fields are compared with each other, and it is judged whether or not there is a motion between the two fields, and the logic block 14 constitutes state shift means for shifting the state on the basis of a judgement result of the motion judgement means and for controlling judgement characteristics of the motion judgement means on the basis of the shifted state.

Specifically, the comparison portion 11 is a comparison portion which compares two fields in a unit of predetermined pixel blocks, compares the identity between pixel blocks, and counts in accordance with the existence or nonexistence of the identity. The detection portion 12 is a judgement portion which compares a count value in the comparison portion 11 with a threshold value, and judges, based on the comparison result, whether or not there is a motion between the two fields. The logic block 14 controls the threshold value of the judgement characteristics of the detection portion 12 on the basis of the shifted state. Hereinafter, the respective portions of the signal processing device 10 will be specifically described.

The comparison portion 11 makes a comparison between two fields as described above. Specifically, a comparison is made for respective pixels, and bits as pixel information are compared. The comparison of bits for the respective pixels is specifically made by upper six bits. Then, the comparison is made such that a predetermined pixel block (one block includes seven pixels) is dealt with as one unit, and this is compared. By this, in the case where the block of seven pixels is different between two fields, the comparison portion 11 adds one in a motion indicator. The motion indicator is basically a counter. The comparison portion 11 makes a comparison as to seven different pixel blocks of the whole field. A count value as the comparison result of the comparison portion 11 is outputted to the detection portion 12.

Here, a comparison timing between two fields in the comparison portion 11 is based on a timing signal outputted from the timing generator 16. The general operation of the timing generator 16 is first explained, and the output of the timing signal to the comparison portion 11 is explained.

The timing generator 16 supplies a variety of timing signals to various blocks. The timing generator 16 generates a variety of timing signals on the basis of a vertical pulse VD and a horizontal pulse HD. Besides, the timing generator 16 generates the timing signals using current phase information outputted from the phase generation portion 15. This is because as described later, most determination by the logic block 14 is made only once in five fields.

In the timing generator 16 like this, the output of the timing signal to the comparison portion 11 is made such that the comparison is made only in the center region of a field picture in the comparison portion 1. This is because there is a possibility that a character or an image which is not a 3-2 pull-down sequence is overlapped at the lower portion or the right side of the field picture. For example, the character or the image which is not the 3-2 pull-down sequence includes subtitles and other messages.

The detection portion (or decoding portion) 12 sets a flag to the inputted field on the basis of the comparison result (count value) of the comparison portion 11. In the case where an inputted field has a motion phase in relation to a field of a comparison object delayed by two fields, the detection portion 12 sets a flag of "1" to the inputted field, and in the case where an inputted field has the same phase as a field of a comparison object delayed by two fields, the detection portion sets a flag of "0" to the inputted field. The determination of the flag in the detection portion 12 is made by comparison between the count value as the comparison result from the comparison portion 11 and the predetermined threshold value as the judgement characteristics. Setting of the predetermined threshold value is changed in accordance with the state shift of the logic block 14, and this will be described in detail later.

Besides, the detection portion 12 determines whether or not there is a motion between the fields as described above, on the basis of the state of the detection portion 12 and two states to the phase in the 3-2 pull-down sequence judged by the detection portion 12.

Figure 5:
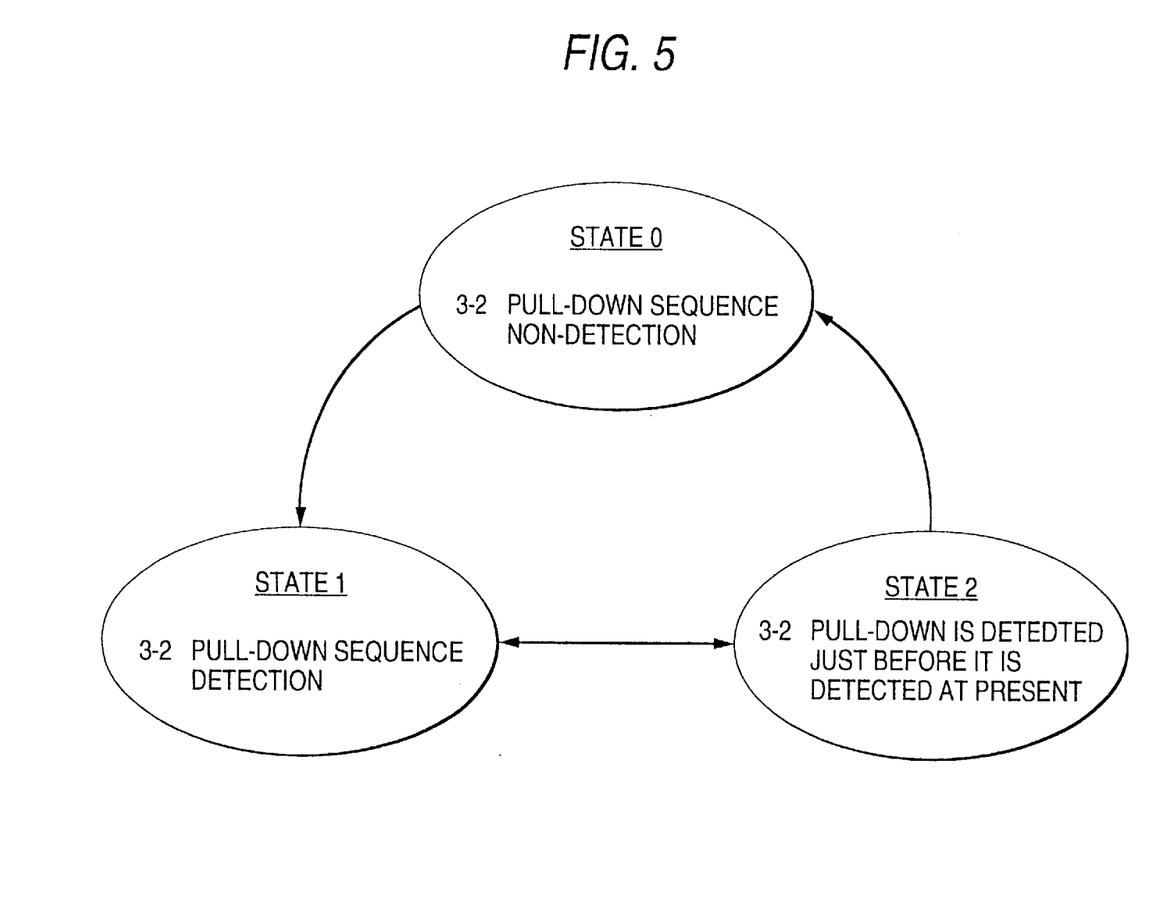
FIG. 5 is a view showing states in which a logic block of the foregoing signal processing device is shifted in accordance with an input source.

FIG. 5 shows states in which the detection portion 12 is put. As shown in FIG. 5, the operation of the detection portion 2 is basically shifted among three states 0 to 2, and is shifted among the three states 0 to 2 in accordance with conditions. In the detection portion 12, the threshold value is controlled in accordance with the state, and the comparison with the count value from the comparison portion 11 is made by different threshold values in the respective states. Like this, the improvement of the detection precision of the 3-2 pull-down source is realized by comparing the threshold value in accordance with each of the plurality of states with the count value from the comparison portion 11. Here, the state is determined by the state setting of the logic block 14. The determination will be described later in detail.

The state 0 is a state in which the 3-2 pull-down source is not detected (recognized).

The state 1 is a state in which the 3-2 pull-down source is detected. In the case where it is detected in the state 0 that the current sequence of five fields is the 3-2 pull-down source, the state 0 is shifted to the state 1.

The state 2 is a state shifted from the state 1 in the case where although the 3-2 pull-down source was detected in a recent path, the 3-2 pull-down source is not detected in the current five field sequence. Here, there is no shift from the state 0 to the state 2.

Figure 6A:
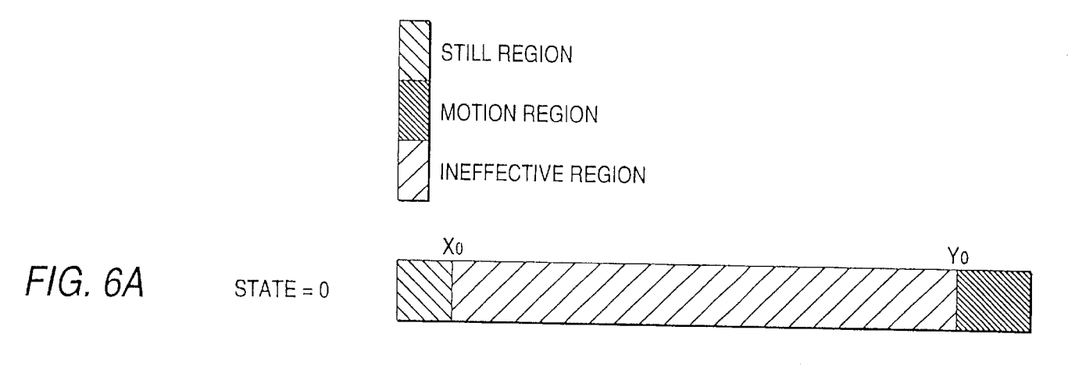
FIGS. 6A to 6C are views showing threshold values which are used for motion judgement in a detection portion of the foregoing signal processing device and are different from each other according to the states.
Figure 6B:
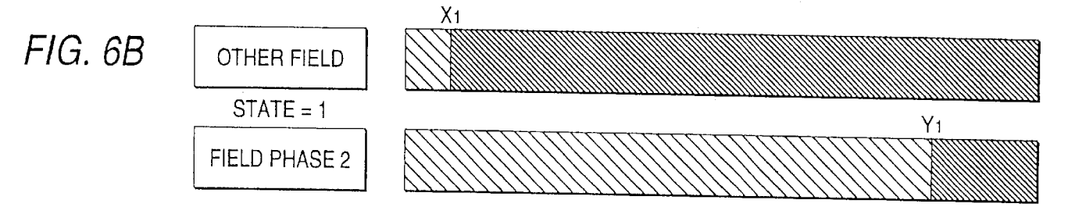
Figure 6C:
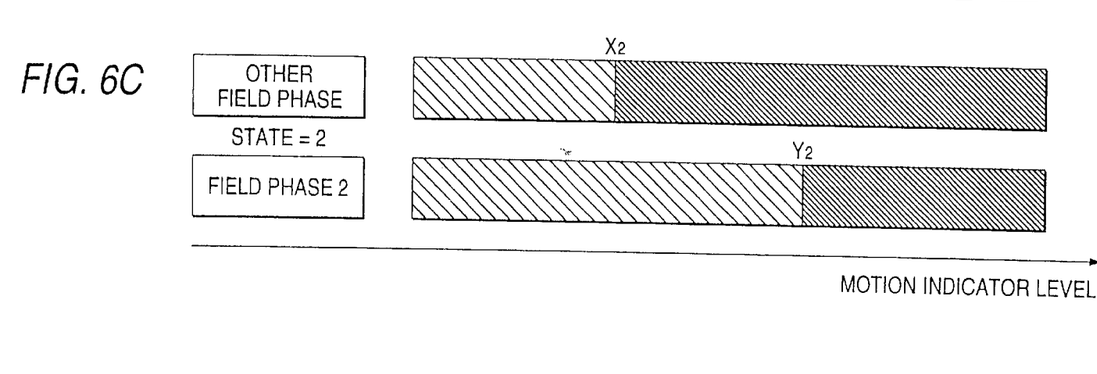

In the respective states like this, the detection portion 12 compares the threshold value corresponding to each of the states with the count value in the comparison portion 1, and detects (judges) the motion between fields on the basis of the comparison result. The threshold values in the respective states are controlled as shown in FIGS. 6A to 6C. In the state 0, the threshold value is as shown in FIG. 6A, in the state 1, the threshold value is as shown in FIG. 6B, and in the state 2, the threshold value is as shown in FIG. 6C. A specific description will be given below.

The case of the state 0 is a case where the input sequence is not yet recognized as the 3-2 pull-down sequence, and the threshold value is made an extreme value to reduce erroneous detection. Specifically, the threshold value for detecting the existence of a motion is made a maximum threshold value $Y_0$, and the threshold value for still detection (detection of nonexistence of motion) is made a minimum threshold value $X_0$. For example, such a threshold value can be called a predictive weighted threshold value (Predictive Weighted threshold).

By the control of the threshold value like this, in the case where the level (count value) of the motion indicator (comparison portion 1) is lower than the threshold value $X_0$, it is determined that the field is a still field. Besides, in the case where the level of the motion Indicator exceeds the threshold value $Y_0$, it is determined that the field is a motion field. When the level of the motion indicator is between the threshold value $X_0$ and the threshold value $Y_0$, it is determined that the field is ineffective. Incidentally, as described later, since the detection of the signal source is made in the unit of the detection result of motion of five fields, in the input sequence, it is not detected as the film source till at least five fields are again effective.

Besides, the case of the state 1 is a case in which the input sequence is recognized as the 3-2 pull-down sequence, and the threshold value is determined in accordance with the phase of the current field in the 3-2 pull-down sequence. Incidentally, also in the case of the state 2, it is determined in accordance with the phase of the current field.

In the case of the state 1, and in the case where the input field is the phase 2, as shown in FIG. 6B, the threshold value is determined to be a threshold value $Y_1$, smaller than the threshold value $Y_0$ of the case of the state 0. In the case where the determination is made in this way, it is detected that there is no motion between two fields in the case where the level of the motion indicator is smaller than the threshold value $Y_1$, and if larger, it is detected that there is a motion between two fields.

Besides, in the state 1, in the case where the input field is one other than the phase 2, that is, in the case of the phase 0, 1, 3 or 4, the threshold value is determined to be a threshold value $X_1$ greatly smaller than $Y_1$. Like this, the threshold value as to the phase 2 is made the threshold value $Y_1$, and the threshold value as to the phase other than the phase 2 is made the threshold value $X_1$ greatly smaller than the threshold value $Y_1$, which is adopted in order to strength the resistance to noise by, under the prediction of existence that there is no motion between two fields, changing the threshold value in accordance with the motion detection.

Here, the phase used for selection of the threshold value is an output value of the phase generation portion 15 described later in detail, and the detection portion 12 controls the threshold value in accordance with the phase 2 generated by the phase generation portion 15 and the phase other than the phase 2.

In the case of the state 2, although the threshold value setting system is used similarly to the state 1, the level of the threshold value is made a minimum value, and specifically, as shown in FIG. 6C, threshold values $X_2$ and $Y_2$ are determined to be close to the substantially center value.

As described above, in the detection portion 12, the threshold value is controlled for each state, and the set threshold value and the level (count value) from the motion indicator (comparison portion 1) are compared with each other. The result of a motion field or a still field as the comparison result is stored in the memory 13 from the detection portion 12. Specifically, the motion field is stored as a bit of "1", and the still field is stored as a bit of "0" in the memory 13. The memory 13 is, for example, a 10-bit memory, and stores the output from the detection portion 12 in a unit of 10 bits. Then, the value stored in the memory 13 is read out by the logic block 14.

The state of the logic block 14 is shifted in accordance with the input source. The logic block 14 outputs the threshold value to the detection portion 12 in accordance with the shifted state. The logic block 14 operates as follows:

The logic block 14 reads out, from the memory 13, motion information (detection result of the detection portion 2) of the last five fields at intervals of five fields. The logic block 14 compares the motion information (pattern) of the last five fields with a predetermined pattern, and determines the threshold value to be transferred to the detection portion 12 and the load value to the phase generation portion 15 on the basis of the comparison result.

For example, the operation of the logic block 14 in the case where the state is determined is as follows:

First, the logic block 14 starts from the state 0 by resetting. Then, in the case where the motion information becomes "11011", specifically, in the case where the motion information as to five fields becomes two consecutive patterns, that is, in the case where the motion information as to ten fields becomes "1101111011", the state 1 is set from the state In the case where the motion information (pattern) read out from the memory 13 remains the pattern of "11011", the logic block 14 keeps the state 1. Then, the field is made a motion field, and in the case where such a pattern is not adapted, the logic block 14 sets the state 2. In the state 2, the logic block 14 sets the threshold value to the substantially center value as described above. Then, the logic block 14 makes a detection of a state in a predetermined time from the shift to the state 2, in which it becomes the state 1. Specifically, the predetermined time is, for example, 5.25 seconds, and in the case where the logic block 14 again detects ten fields of the pattern of "11011" in 5.25 seconds, it again sets the state 1, and in the case where ten fields of the pattern of "11011" can not be detected in 5.25 seconds, the state 0 is set.

Like this, in the state 1, when the motion information (pattern) of fields does not conform to a predetermined pattern, the state does not immediately return to the state 0, but the state 2 is once set, and in the case where the motion information does not conform to it in the end after waiting of a predetermined time, the state returns to the state 0, so that such a case is prevented that the state 1 is shifted to the state 0 by erroneous detection.

The logic block 14 shifts the state in accordance with the input source in this way, and outputs the information as to whether or not the input source is the 3-2 pull-down source to the outside.

Figure 7:
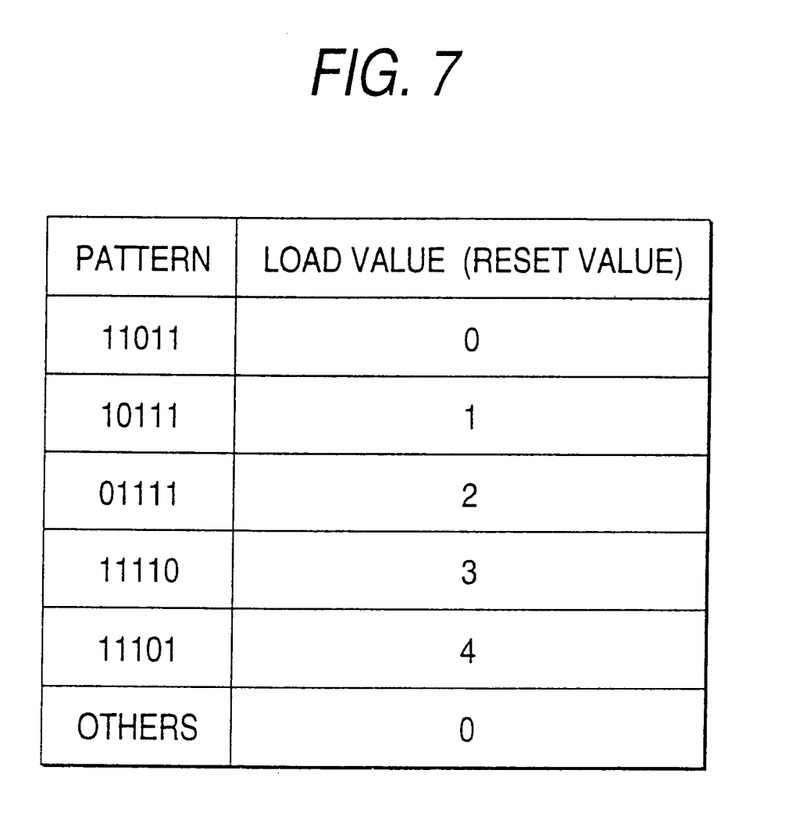
FIG. 7 is a view showing the relation between a pattern inputted from a memory to a logic block and a load value outputted from the logic block according to the pattern in the foregoing signal processing device.

The value of the logic block 14 for shifting the respective states is used as a reset value in the phase generation portion 15. The operation of the phase generation portion 15 is as follows:

The phase generation portion 15 starts counting at the time of the start of each field, and is basically a counter of 0 to 4. That is, the counting starts at the start of each field. When the phase reaches "5", the phase generation portion 15 loads the phase value detected by the logic block 14 as a reset value. The relation between the pattern detected by the logic block 14 and the reset value (load value) is as shown in FIG. 7. Incidentally, in the phase generation portion 15, when the phase reaches "5", the reset value is loaded from the logic block 14, so that the count state of "5" does not exist in the phase generation portion 15.

The phase value outputted from the phase generation portion 15 is outputted to the outside as the phase information which indicates the kind of the field of the current field, and is used as the information for selection of the threshold value in the detection portion 12 as described above.

The signal detection device 10 is constructed as described above, detects the 3-2 pull-down source and the phase in the 3-2 pull-down source, and outputs the information to the outside. Then, the signal detection device 10 can detect the 3-2 pull-down source and the phase by the simple method, so that the following particulars can be realized.

It is possible to realize a simple television film detector integrated in an LSI, which supplies reliable and accurate television film information.

Besides, the phase of a current television film sequence can be recognized by an image up converter, and high quality image reproduction is made possible.

Besides, in an MPEG (Moving Picture Experts Group) coder and telecine applications such as other applications, the coder can satisfactorily recognize the input signal sequence.

Besides, an error in the phase of a telecine sequence can be immediately detected, and is corrected to information from the signal detection device to which the present invention is applied.

Besides, since the detection of the 3-2 pull-down source is made at a relatively low speed, the detection characteristics can be improved.

Besides, after the 3-2 pull-down source is detected, the phase change can be correctly detected.

As described above, according to the signal processing device of the present invention, fields constituting a signal source are successively inputted, two fields are compared with each other, the motion judgement means judges whether or not there is a motion between the two fields, and the state is shifted on the basis of the judgement result of the motion judgement means, and further, the judgement characteristics of the motion judgement means is controlled by the state shift means on the basis of the shifted state, so that it is possible to judge whether or not there is a motion between two fields by the motion judgement means having the judgement characteristics controlled to become optimum in accordance with the inputted field.

By this, since the judgement characteristics are controlled to become optimum in accordance with the inputted field, the judgement as to whether or not there is a motion becomes resistant to noise.

Besides, for example, it becomes possible for the signal processing device to identify the kind of a field and the kind of a signal source on the basis of the judgement result of the motion.

Besides, the signal processing method of the present invention includes a motion judgement step in which fields constituting a signal source are successively inputted, adjacent odd or even fields are compared with each other, and judgement means judges whether or not there is a motion between the odd or even fields, and a state shift step in which a state is shifted on the basis of a judgement result at the motion judgement step, and judgement characteristics of the motion judgement means are set on the basis of the shifted state, so that it is possible to judge whether or not there is a motion between the two fields by the motion judgement means having the judgement characteristics controlled to become optimum in accordance with the inputted field.

By this, since the judgement characteristics are controlled to become optimum in accordance with the inputted field, the judgement as to whether or not there is a motion becomes resistant to noise.

Besides, for example, by the signal processing method, it becomes possible to identify the kind of a field and the kind of a signal source on the basis of the judgement result of the motion.

What is claimed is:

1. A signal processing device comprising:

input means for inputting a signal acquired via pull-down processing;

motion judgement means in which fields constituting either signal source are successively inputted, two fields are compared with each other, and it is judged whether or not there is a motion between the two fields; and state shift means for shifting a state on the basis of a judgement result of the motion judgement means and for controlling judgement characteristics of the motion judgement means on the basis of the shifted state in order to identify a format of the input signal.

2. The signal processing device according to claim 1, wherein:

an National Television System Committee (NTSC) signal subjected to a 3-2 pull-down processing in which a relation having a motion and a relation having no motion between two fields different from each other in time occur at intervals of five periods, is inputted as the signal source, and the signal processing device comprises signal identification means for identifying five kinds of fields and a kind of the signal source on the basis of the judgement result of the motion judgement means.

3. The signal processing device according to claim 1, wherein the motion judgement means compares, as the two fields, adjacent odd fields or adjacent even fields.

4. A signal processing device according to claim 1, wherein:

at least an National Television System Committee (NTSC) signal subjected to a 3-2 pull-down processing is inputted as the signal source, and the state shift means makes a shift between a first state of a case where the signal subjected to the 3-2 pull-down processing is inputted and a second state of a case where a signal other than the signal subjected to the 3-2 pull-down processing is inputted, and produces the judgement characteristics for the signal subjected to the 3-2 pull-down processing in the first state, and the judgement characteristics for the signal other than the 3-2 pull-down signal in the second state.

5. The signal processing device according to claim 1, wherein:

an National Television System Committee (NTSC) signal subjected to a 3-2 pull-down processing in which a relation having a motion and a relation having no motion between two fields different from each other in time occur at intervals of five periods, is inputted as the signal source, and the state shift means produces the judgement characteristics corresponding to existence of a motion by predicting acquisition of a judgement result that there is a motion in the judgement means, and produces the judgement characteristics corresponding to nonexistence of a motion by predicting acquisition of a judgement result that there is no motion in the judgement means.

6. The signal processing device according to claim 1, wherein the motion judgement means includes:

a comparison portion for comparing the two fields in a unit of predetermined pixel blocks, comparing identity between pixel blocks, and counting according to whether the identity exists; and a judgement portion for comparing a count value in the comparison portion with a threshold value, and judging whether or not there is a motion between the two fields on the basis of the comparison result, and wherein the state shift means controls the threshold value as the judgement characteristics of the judgement portion on the basis of the shifted state.

7. A signal processing device according to claim 6, wherein:

at least an National Television System Committee (NTSC) signal subjected to a 3-2 pull-down processing in which a relation having a motion and a relation having no motion between two fields different from each other in time occur at intervals of five periods, is inputted as the signal source, the state shift means shifts the state among an initial state in which a signal other than the signal subjected to the 3-2 pull-down processing is inputted, a first state which is shifted from the initial state and in which the signal subjected to the 3-2 pull-down processing is inputted, and a second state which is shifted from the first state and in which when the signal subjected to the 3-2 pull-down processing is inputted in a definite time from the shift from the first state, the second state returns to the first state, and when the signal subjected to the 3-2 pull-down processing is not inputted in the definite time from the shift from the first state, the second state shifts to the initial state, and by the state shift means, in the initial state, a threshold value for judgement of existence of the motion between the two fields is made large, and a threshold value for judgement of nonexistence of the motion between the two fields is made small, in a case of the first state, a threshold value for judgement of existence of the motion is made small when acquisition of a judgement result of existence of the motion between the two fields is predicted, and a threshold value for judgement of nonexistence of the motion is made large when acquisition of a judgement result of nonexistence of the motion between the two fields is predicted, and in a case of the second state, a threshold value for judgement of existence of the motion is made smaller than that of the initial state and is made larger than that of the first state when acquisition of a judgement result of existence of the motion between the two fields is predicted, and a threshold value for judgement of nonexistence of the motion between the two fields is made larger than that of the initial state and is made smaller than that of the first state when acquisition of a judgement result of nonexistence of the motion between the two fields is predicted.

8. The signal processing device according to claim 1, wherein:

at least an National Television System Committee (NTSC) signal subjected to a 3-2 pull-down processing in which a relation having a motion and a relation having no motion between two fields different from each other in time occur at intervals of five periods, is inputted as the signal source, the motion judgement means stores a judgement result as to whether or not there is a motion between the two fields in information storage means as one-bit information, and the state shift means shifts the state on the basis of five bits stored in the information storage means.

9. A signal processing method comprising:

an input step for inputting a signal acquired via pull-down processing;

a motion judgement step in which fields constituting a signal source are successively inputted, two fields are compared with each other, and it is judged by judgement means whether or not there is a motion between the two fields; and a state shift step of shifting a state on the basis of a judgement result at the motion judgement step and controlling judgement characteristics of the motion judgement means on the basis of the shifted state in order to identify a format of the input signal.

* * * * *